(12) United States Patent
Sharma et al.

(10) Patent No.: US 9,444,744 B1
(45) Date of Patent: Sep. 13, 2016

(54) LINE-RATE SELECTIVE LOAD BALANCING OF PERMITTED NETWORK TRAFFIC

(71) Applicant: CISCO TECHNOLOGY, INC., San Jose, CA (US)

(72) Inventors: Samar Sharma, San Jose, CA (US); Mouli Vytla, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/696,209

(22) Filed: Apr. 24, 2015

Related U.S. Application Data

(60) Provisional application No. 62/143,083, filed on Apr. 4, 2015.

(51) Int. Cl.
| | |
|---|---|
| *H04L 12/26* | (2006.01) |
| *H04L 12/803* | (2013.01) |
| *H04L 29/08* | (2006.01) |
| *H04L 12/911* | (2013.01) |

(52) U.S. Cl.
CPC .......... *H04L 47/125* (2013.01); *H04L 47/726* (2013.01); *H04L 67/1002* (2013.01)

(58) Field of Classification Search
None
See application file for complete search history.

(56) References Cited

U.S. PATENT DOCUMENTS

| | | | | |
|---|---|---|---|---|
| 6,996,615 | B1 * | 2/2006 | McGuire | 709/226 |
| 7,808,897 | B1 * | 10/2010 | Mehta et al. | 370/230 |
| 2005/0125424 | A1 * | 6/2005 | Herriott | H04L 69/22 |
| 2011/0110382 | A1 * | 5/2011 | Jabr et al. | 370/422 |
| 2011/0116443 | A1 * | 5/2011 | Yu et al. | 370/328 |
| 2012/0117571 | A1 * | 5/2012 | Davis | H04L 41/0806 718/105 |
| 2014/0006535 | A1 | 1/2014 | Reddy | |
| 2014/0282611 | A1 | 9/2014 | Campbell et al. | |
| 2015/0117458 | A1 * | 4/2015 | Gurkan et al. | 370/392 |

OTHER PUBLICATIONS

U.S. Appl. No. 14/687,712, filed Apr. 15, 2015, entitled "Utilizing User-Specified Access Control Lists in Conjunction With Redirection and Load-Balancing on a Port," Inventor(s): Samar Sharma, et al.
U.S. Appl. No. 14/696,200, filed Apr. 24, 2015, entitled "Statistical Operations Associated With Network Traffic Forwarding," Inventor(s): Samar Sharma, et al.
U.S. Appl. No. 14/693,925, filed Apr. 23, 2015, entitled "Selective Load Balancing of Network Traffic," Inventor(s): Samar Sharma, et al.
U.S. Appl. No. 14/696,226, filed Apr. 24, 2015, entitled "Load Balancing Methods for a Network Switch," Inventor(s): Samar Sharma, et al.

\* cited by examiner

*Primary Examiner* — Edan Orgad
*Assistant Examiner* — Rebecca Song
(74) *Attorney, Agent, or Firm* — Patent Capital Group

(57) ABSTRACT

In one embodiment, an indication of a plurality of network nodes, load balancing criteria, and one or more access control list (ACL) entries are received. A plurality of forwarding entries are created, a forwarding entry of the plurality of forwarding entries based upon an ACL entry and the load balancing criteria and corresponding to a network node of the plurality of network nodes. A network element applies the plurality of forwarding entries to network traffic to selectively load balance the network traffic, wherein network traffic meeting the load balancing criteria and permitted by the one or more ACL entries is load balanced among the plurality of network nodes.

21 Claims, 4 Drawing Sheets

| 300 | DEVICE GROUP | DESTINATION IP RANGE | L4 PROTOCOL | L4 PORT |
|---|---|---|---|---|
| | 1.1.1.1; 1.1.1.2; 1.1.1.3; 1.1.1.4 | 200.200.0.0/255.255.255.255 | TCP | 80 |

| 320 | OPERATION | SOURCE IP RANGE | DESTINATION IP RANGE |
|---|---|---|---|
| 322a | PERMIT | 100.100.0.0/16 | 0.0.0.0/0 |
| 322b | PERMIT | 200.200.0.0/16 | 0.0.0.0/0 |

| 350 | OPERATION | PORT IDENTIFIER | SOURCE IP RANGE | DESTINATION IP RANGE | L4 PROTOCOL | L4 PORT |
|---|---|---|---|---|---|---|
| 352a | REDIRECT | (0x60) | 100.100.0.0/255.255.0.192 | 200.200.0.0/255.255.255.255 | TCP | 80 |
| 352b | REDIRECT | (0x61) | 100.100.0.64/255.255.0.192 | 200.200.0.0/255.255.255.255 | TCP | 80 |
| 352c | REDIRECT | (0x5f) | 100.100.0.128/255.255.0.192 | 200.200.0.0/255.255.255.255 | TCP | 80 |
| 352d | REDIRECT | (0x62) | 100.100.0.192/255.255.0.192 | 200.200.0.0/255.255.255.255 | TCP | 80 |
| 352e | REDIRECT | (0x60) | 200.200.0.0/255.255.0.192 | 200.200.0.0/255.255.255.255 | TCP | 80 |
| 352f | REDIRECT | (0x61) | 200.200.0.64/255.255.0.192 | 200.200.0.0/255.255.255.255 | TCP | 80 |
| 352g | REDIRECT | (0x5f) | 200.200.0.128/255.255.0.192 | 200.200.0.0/255.255.255.255 | TCP | 80 |
| 352h | REDIRECT | (0x62) | 200.200.0.192/255.255.0.192 | 200.200.0.0/255.255.255.255 | TCP | 80 |
| 354a | PERMIT | | 100.100.0.0/16 | 0.0.0.0/0 | | |
| 354b | PERMIT | | 200.200.0.0/16 | 0.0.0.0/0 | | |
| 354c | DENY | | 0.0.0.0/0 | 0.0.0.0/0 | | |

300 →

| DEVICE GROUP | DESTINATION IP RANGE | L4 PROTOCOL | L4 PORT |
|---|---|---|---|
| 1.1.1.1; 1.1.1.2; 1.1.1.3; 1.1.1.4 | 200.200.0.0/255.255.255.255 | TCP | 80 |

320 →

| | OPERATION | SOURCE IP RANGE | DESTINATION IP RANGE |
|---|---|---|---|
| 322a | PERMIT | 100.100.0.0/16 | 0.0.0.0/0 |
| 322b | PERMIT | 200.200.0.0/16 | 0.0.0.0/0 |

350 →

| | OPERATION | PORT IDENTIFIER | SOURCE IP RANGE | DESTINATION IP RANGE | L4 PROTOCOL | L4 PORT |
|---|---|---|---|---|---|---|
| 352a | REDIRECT | (0x60) | 100.100.0.0/255.255.0.192 | 200.200.0.0/255.255.255.255 | TCP | 80 |
| 352b | REDIRECT | (0x61) | 100.100.0.64/255.255.0.192 | 200.200.0.0/255.255.255.255 | TCP | 80 |
| 352c | REDIRECT | (0x5f) | 100.100.0.128/255.255.0.192 | 200.200.0.0/255.255.255.255 | TCP | 80 |
| 352d | REDIRECT | (0x62) | 100.100.0.192/255.255.0.192 | 200.200.0.0/255.255.255.255 | TCP | 80 |
| 352e | REDIRECT | (0x60) | 200.200.0.0/255.255.0.192 | 200.200.0.0/255.255.255.255 | TCP | 80 |
| 352f | REDIRECT | (0x61) | 200.200.0.64/255.255.0.192 | 200.200.0.0/255.255.255.255 | TCP | 80 |
| 352g | REDIRECT | (0x5f) | 200.200.0.128/255.255.0.192 | 200.200.0.0/255.255.255.255 | TCP | 80 |
| 352h | REDIRECT | (0x62) | 200.200.0.192/255.255.0.192 | 200.200.0.0/255.255.255.255 | TCP | 80 |
| 354a | PERMIT | | 100.100.0.0/16 | 0.0.0.0/0 | | |
| 354b | PERMIT | | 200.200.0.0/16 | 0.0.0.0/0 | | |
| 354c | DENY | | 0.0.0.0/0 | 0.0.0.0/0 | | |

FIG. 3

US 9,444,744 B1

LINE-RATE SELECTIVE LOAD BALANCING OF PERMITTED NETWORK TRAFFIC

RELATED APPLICATION

This application claims benefit under 35 U.S.C. §119(e) of U.S. Provisional Application Ser. No. 62/143,083, entitled "LINE-RATE HANDLING OF VARIOUS NETWORK ELEMENT FUNCTIONS," filed Apr. 4, 2015.

TECHNICAL FIELD

This disclosure relates in general to the field of communications and, more particularly, to line-rate selective load balancing of permitted network traffic.

BACKGROUND

A network element may include one or more ingress ports and one or more egress ports. The network element may receive network traffic through the ingress ports. As an example, network traffic may include one or more packets containing control information and data. The network element may perform various operations on the network traffic to select one or more of the egress ports for forwarding the network traffic. The network element then forwards the network traffic on to one or more devices coupled to the network element through the one or more egress ports.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 illustrates example load balancing criteria, access control list (ACL) entries, and traffic forwarding entries in accordance with certain embodiments.

DETAILED DESCRIPTION OF EXAMPLE EMBODIMENTS

Overview

In one embodiment, an indication of a plurality of network nodes, load balancing criteria, and one or more access control list (ACL) entries are received. A plurality of forwarding entries are created, a forwarding entry of the plurality of forwarding entries based upon an ACL entry and the load balancing criteria and corresponding to a network node of the plurality of network nodes. A network element applies the plurality of forwarding entries to network traffic to selectively load balance the network traffic, wherein network traffic meeting the load balancing criteria and permitted by the one or more ACL entries is load balanced among the plurality of network nodes.

Example Embodiments

Figure 1:
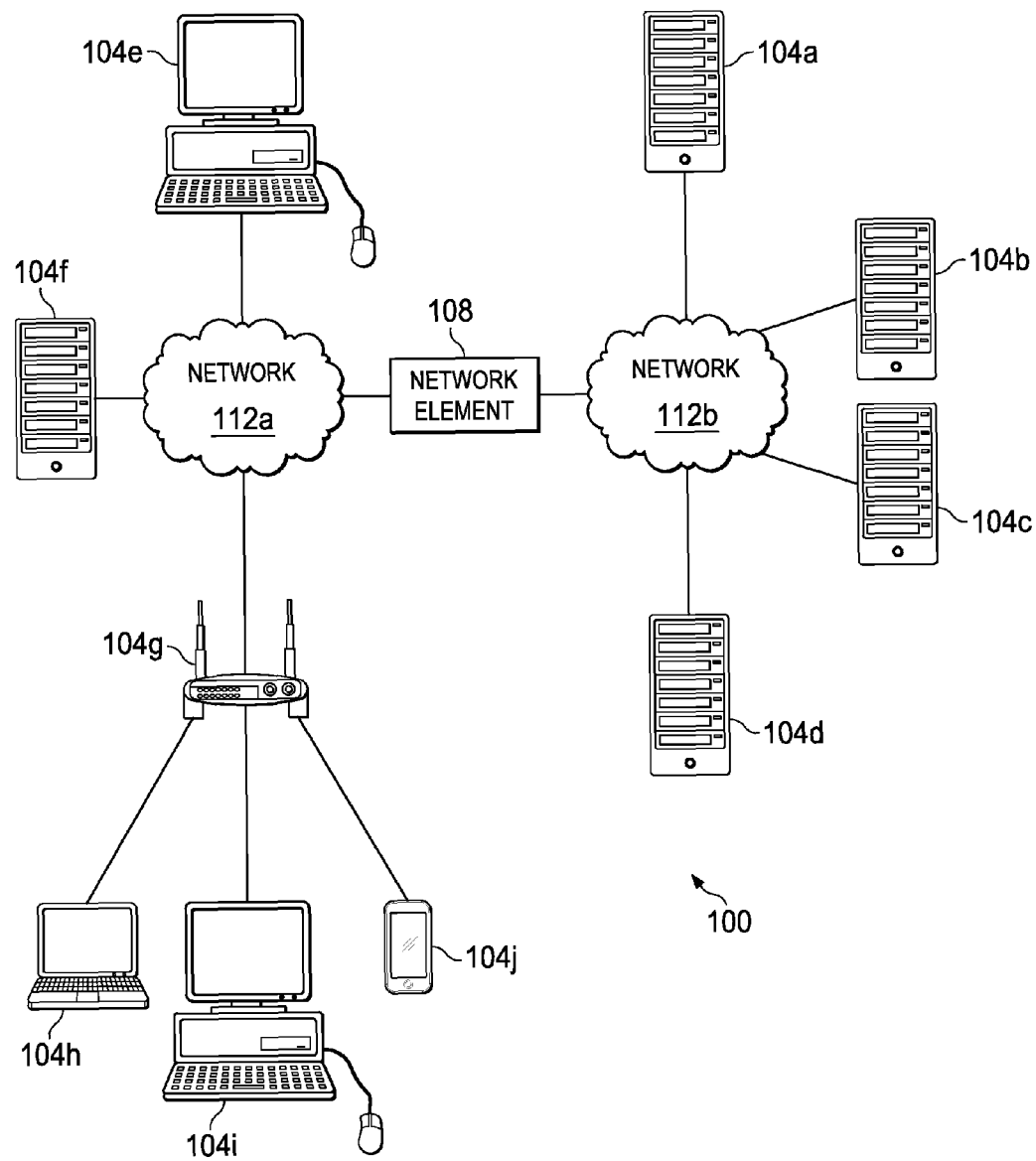
FIG. 1 illustrates a block diagram of a system for line-rate selective load balancing of permitted network traffic in accordance with certain embodiments.

FIG. 1 illustrates a block diagram of a system 100 for line-rate selective load balancing of permitted network traffic in accordance with certain embodiments. System 100 includes various network nodes 104 coupled to network element 108 via networks 112. In operation, network element 108 forwards network traffic (e.g., data packets) from one or more network nodes 104 or an internal component of network element 108 to one or more other network nodes 104 or an internal component of network element 108. In various embodiments, network element 108 may perform network traffic bridging (e.g., L2 bridging) based on forwarding tables linking destination media access control (MAC) addresses with ports of the network element 108. Network element 108 may implement various load balancing criteria and access control lists (ACLs) received from a network administrator associated with network element 108. As an example, a network administrator may instruct network element 108 to load balance traffic that matches the load balance criteria and is permitted by the ACLs and to forward traffic that does not meet the criteria and is not blocked by the ACLs in a normal manner. Thus, the network element 108 may provide customization of the traffic forwarding by a network administrator.

As the number of network nodes in a network increases, complexity in the network increases as well. As the network complexity increases, implementation of customized traffic forwarding rules may require additional hardware and/or software resources, power, and time to implement, particularly if the customization is implemented in a serial fashion. For example, if a user desires to apply ACLs to traffic and selectively load balance the traffic, the user may need to configure multiple pieces of equipment. For example, the user may configure a first line card to permit or deny traffic based on the ACLs, a second line card to select particular traffic, and a third line card that performs the load balancing of the traffic selected by the second line card. Alternatively, a network appliance may be used to apply ACLs and to select and load balance traffic, but this would introduce latency that is undesirable in a network element, such as a network switch, that is used for high speed bridging and/or routing operations since a network appliance would perform these functions in software (i.e., a processor of the network appliance would execute instructions in order to perform these functions).

Various embodiments of the present disclosure provide systems and methods for line-rate selective load balancing of permitted network traffic. This may include simultaneous application of ACL, traffic selection, and load-balancing operations to network traffic. Such embodiments provide efficient utilization of network element 108's resources and faster operation than systems that perform traffic forwarding customization operations in a serial fashion and/or in software. In particular embodiments, information from an ACL, traffic selection criteria, and load balancing criteria may be merged and applied to network traffic in a single clock cycle of network element 108. In some embodiments, such criteria may be applied at a line-rate of the network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with selectively load-balancing permitted network traffic. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and/or receive information in a network environment. For example, network nodes may include network switches, routers, servers (physical servers or servers virtually implemented on physical hardware) (e.g., servers 104*a-d* and 104*f*), machines (physical machine or machines virtually implemented on physical hardware), end user devices (such as laptop 104*h*, desktop computers 104*e* and 104*i*, smartphone 104*j*), access points (e.g., 104*g*), cable boxes, gateways, bridges, loadbalancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

A network 112 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) and/or other communications for the transmission and/or reception of packets in a network.

Figure 2:
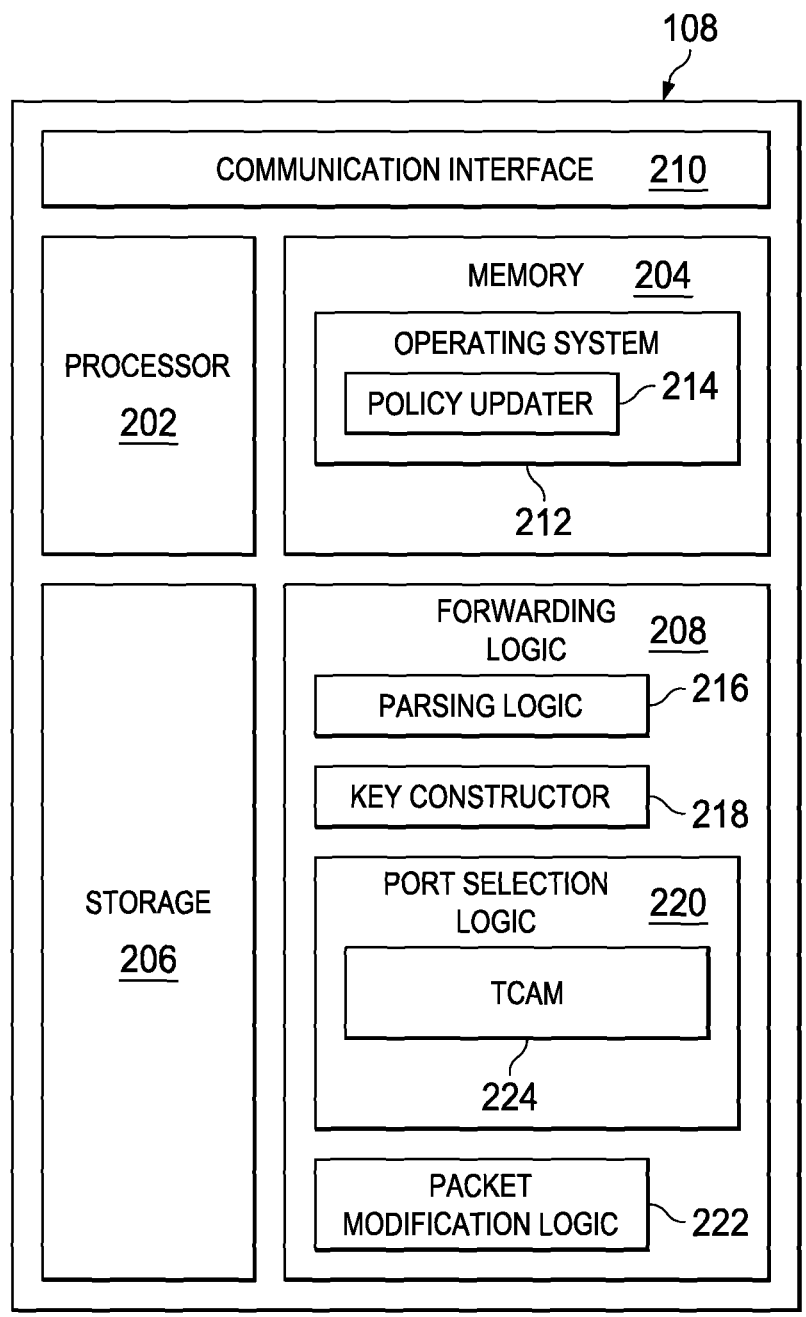
FIG. 2 illustrates a block diagram of a network element that performs line-rate selective load balancing of permitted network traffic in accordance with certain embodiments.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and/or a display. As an example, network element 108 comprises a computer system that includes one or more processors 202, memory 204, storage 206, and one or more communication interfaces 210. These components may work together in order to provide functionality described herein. Network element may also comprise forwarding logic 208. Forwarding logic 208 may be operable to implement user-specified traffic forwarding rules to traffic received via communication interface 210 and send the traffic processed by the rules to communication interface 210 for forwarding out of the appropriate port of network element 108.

Communication interface 210 may be used for the communication of signaling and/or data between network element 108 and one or more networks (e.g., 112*a* or 112*b*) and/or network nodes 104 coupled to a network 112. For example, communication interface 210 may be used to send and receive network traffic such as data packets. Each communication interface 210 may send and receive data and/or signals according to a distinct standard such as Asynchronous Transfer Mode (ATM), Frame Relay, or Gigabit Ethernet (or other IEEE 802.3 standard). In a particular embodiment, communication interface 210 comprises one or more ports that may each function as an ingress and/or egress port. As one example, communication interface 210 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 204 and/or storage 206 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 204 and/or storage 206 may store any suitable data or information utilized by network element 108, including software embedded in a computer readable medium, and/or encoded logic incorporated in hardware or otherwise stored (e.g., firmware). Memory 204 and/or storage 206 may also store the results and/or intermediate results of the various calculations and determinations performed by processor 202.

In certain example implementations, the customized traffic forwarding functions outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein may be construed as being encompassed within the broad term 'memory element.' Similarly, any of the potential processing elements, modules, and machines described in this Specification may be construed as being encompassed within the broad term 'processor.'

In one implementation, a network element 108 described herein may include software to achieve (or to facilitate) the functions discussed herein for customized traffic forwarding where the software is executed on one or more processors 202 to carry out the functions. This could include the implementation of one or more instances of an operating system 212, policy updater 214, and/or any other suitable elements that foster the activities discussed herein. In other embodiments, one or more of these elements may be implemented in hardware and/or firmware such as reprogrammable logic in an FPGA or ASIC.

In some embodiments, the operating system 212 provides an application program interface (API) that allows a network administrator to provide information to the network element 108. For example, the API may allow the network administrator to specify traffic customization information such as one or more ACLs and load balancing criteria. In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 212 may be capable of communicating the traffic customization information received from the network administrator to other portions of network element 108 (e.g., to forwarding logic 208). In particular embodiments, the operating system 212 is operable to utilize a policy updater 214 to program logic of network element 108 based on traffic customization information received by the operating system 212 (e.g., from the network administrator).

In various embodiments, the operating system 212 receives ACLs and load balancing criteria and communicates with forwarding logic 208 to implement the ACLs and load balancing criteria. In various embodiments, these ACLs and criteria are converted into a format suitable for use by forwarding logic 208 (e.g., "forwarding entries" as described herein) before being communicated to forwarding logic 208. In other embodiments, the merged ACLs and load balancing criteria are received by the operating system 212 in a format used by forwarding logic 208, such that no conversion is needed. In yet other embodiments, forwarding logic 208 may convert the ACLs and load balancing criteria into a format suitable for use by forwarding logic 208. In some embodiments, an ACL or load balancing criteria may be applied to traffic received via a single port of network element 108 or to traffic received through multiple ports of the network element. Different traffic customization information may be applied to different ports.

An ACL may be used to filter network traffic by controlling whether received packets are forwarded or blocked at one or more ports of the network element 108. An ACL may include one or more ACL entries. An ACL entry specifies matching criteria and an indication of whether packets that meet the matching criteria should be permitted (i.e., forwarded) or denied (i.e., blocked). Any suitable matching criteria may be specified, such as one or more identifiers associated with the source and/or destination of the packet or other identifier associated with the packet. For example, the matching criteria may include one or more source addresses (e.g., IP addresses, media access control (MAC) addresses, or other addresses identifiable in a data packet) and/or one or more destination addresses (e.g., IP addresses, MAC addresses, or other addresses). As another example, the matching criteria may include one or more source or destination L4 ports associated with (e.g., specified by) the packet. In some embodiments, the matching criteria may alternatively or additionally include one or more protocols (e.g., one or more L3 protocols such as IPv4 or IPv6 or one or more L4 protocols such as TCP or User Datagram Protocol (UDP)), one or more quality of service parameters (QoS), one or more virtual local area network (VLAN) identifiers, and/or other suitable information associated with (e.g., specified by) the packet. For example, an ACL entry may apply only to traffic associated with a single protocol (e.g., Hypertext Transfer Protocol [HTTP]) or may apply to traffic associated with multiple protocols (e.g., HTTP, Secure Sockets Layer [SSL], and File Transfer Protocol [FTP]). In some embodiments, an ACL may include separate ACL entries that are each associated with a different protocol.

Load balancing criteria may be used to load balance traffic matching the criteria among a plurality of network nodes. Any suitable matching criteria may be specified, such as one or more identifiers associated with the source and/or destination of an incoming data packet. For example, the matching criteria may include one or more source addresses (e.g., IP addresses, media access control (MAC) addresses, or other addresses identifiable in a data packet) and/or one or more destination addresses (e.g., IP addresses, MAC addresses, or other addresses). In some embodiments, the matching criteria may alternatively or additionally include one or more protocols (e.g., one or more L3 protocols such as IPv4 or IPv6 or one or more L4 protocols such as TCP or UDP), one or more QoS parameters, one or more virtual local area network (VLAN) identifiers, and/or other suitable information associated with (e.g., specified by) the packet.

As another example, the matching criteria may include one or more source or destination L4 ports associated with (e.g., specified by) the packet.

A load balancing command may specify a load balancing scheme. For example, with respect to the embodiment depicted in FIG. 1, a load balancing scheme may specify how traffic forwarded by network element 108 is to be distributed among servers 104a-d. Network element 108 may load balance among any number of suitable network nodes 104, such as firewalls, application servers, other load balancers (e.g., load balancers that perform load balancing in software), inspection devices, etc.

In particular embodiments, a user may provide a load balancing command specifying that particular traffic is load balanced while other traffic is not load balanced (e.g., the other traffic may be blocked according to criteria in a forwarding entry created based on an ACL entry or routed normally by using a forwarding table). In one embodiment, a network administrator or other entity associated with network element 108 may specify one or more destination addresses (e.g., a virtual IP address or range of virtual IP addresses of the network element 108) and one or more L4 parameters (such as one or more L4 protocols and/or L4 destination ports) as load balancing criteria. Thus, traffic matching this criteria will be load balanced among available load balancing network nodes while traffic not matching this criteria will be handled in another manner (e.g., according to a forwarding table or blocked by an forwarding entry that implements an ACL operation). In some embodiments, this criteria may be applied to traffic received at a particular port, at a group of logically associated ports, or at all ports of the network element 108.

In some embodiments, load balancing criteria may be expressed at a higher level of abstraction than one or more corresponding forwarding entries that are created based on the load balancing criteria. For example, load balancing criteria may merely specify that network traffic is to be split evenly among available servers of a device group (e.g., the four servers 104a-d) while the resulting forwarding entries may specify matching criteria and redirection information to implement the load balancing scheme specified by the initial load balancing criteria. As an example, network element 108 may receive load balancing criteria specifying that incoming traffic should be load balanced among a plurality of network nodes and may create a forwarding entry for each network node that specifies a distinct range of source IP addresses. Thus, when incoming network traffic matches the address range specified in a particular forwarding entry, the network traffic is redirected to the network node specified in the forwarding entry. In various embodiments, the forwarding entries may have other load balancing criteria that must also be met in order to be applied to incoming network traffic, such as any of the criteria described above.

The load balancing criteria and ACLs may be generated by any suitable entity, such as the network administrator or various features of network element 108. For example, load balancing criteria or ACLs may be received from any suitable feature of network element 108, such as a load balancing feature, a module implementing Web Cache Communication Protocol, a core policy (e.g., a policy that limits traffic going to processor 202 or a supervisor module associated with network element 108), etc. When load balancing criteria or ACL information is generated or received by a component of network element 108, the load balancing criteria or ACL may be passed to the operating system 212. The operating system 212 (or other suitable component of network element 108) is responsible for facilitating the merging of the ACL with load balancing criteria to create a set of forwarding entries that implement the ACL(s) and load balancing criteria. The merging may be performed by any suitable element of network element 108, such as operating system 212, policy updater 214, forwarding logic 208, or other entity. When a new ACL or load balancing criteria is received (e.g., by operating system 212) for a particular port, the existing forwarding entries for that port may be updated to reflect integration of the new ACL or load balancing criteria with the load balancing criteria or ACL(s) already being used to forward traffic received on that port. The forwarding entries are programmed into a content addressable memory of port selection logic 220, such as TCAM 224 and used to forward traffic received on the associated port(s).

In various embodiments, operating system 212 or other network element component may update the forwarding entries resulting from the load balancing criteria in response to a change in network topology (e.g., when an additional network node 104 becomes available to load balance or one of the network nodes 104a-d goes down). In particular embodiments, this may include changing a range of source IP addresses specified in each forwarding entry such that network traffic is distributed evenly (or unevenly if specified by the load balancing scheme) among the available network nodes 104 in accordance with the load balancing criteria.

In particular embodiments, operating system 212 creates one or more additional forwarding entries after generating the forwarding entries from the load balancing criteria and ACL entries. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may be placed in order of priority such that a traffic forwarding entry with a higher priority is checked for a match with a packet to be forwarded before the traffic forwarding entry with the lower priority is checked for a match with the packet. In other embodiments, traffic forwarding entries may each have a priority assigned to them, such that if network traffic matches multiple traffic forwarding entries, the traffic forwarding entry with the highest priority will be applied to the traffic. In some embodiments, a default forwarding entry (e.g., a forwarding entry specifying that all traffic should be permitted) has the lowest priority of the traffic forwarding entries. In various embodiments, the priorities of the traffic forwarding entries are based on user-specified rules associated with the load balancing criteria and ACL entries that are merged to form the traffic forwarding entries.

As mentioned earlier, the policy updater 214 may be responsible for sending the forwarding entries to the forwarding logic 208 to be implemented. As one example, the policy updater 214 may instruct that the forwarding entries be programmed into a memory such as a content addressable memory (e.g., TCAM 224) of the port selection logic 220 (e.g., by calling a hardware driver associated with the TCAM).

Forwarding logic 208 is operable to apply the forwarding entries to network traffic received by network element 108. In the embodiment depicted, forwarding logic 208 includes parsing logic 216, key construction logic 218, port selection logic 220, and packet modification logic 222. In various embodiments, any suitable portion of forwarding logic 208 may comprise programmable logic (e.g., software/computer instructions executed by a processor), fixed logic, programmable digital logic (e.g., an FPGA, an EPROM, an EEPROM, or other device), an ASIC that includes digital logic, software, code, electronic instructions, or any suitable combination thereof. In a particular embodiment, forwarding logic 208 comprises an ASIC or other device that is operable to perform customized traffic forwarding in hardware by utilizing logic (e.g., one or more memories such as TCAM 224) that is reprogrammable by an entity (e.g., the operating system 212) based on traffic customization information (e.g., received from a network administrator). In such an embodiment, the functions of parsing logic 216, key construction logic 218, port selection logic 220, and packet modification logic 222 are performed in hardware by such logic (in contrast to an implementation where such functions may be performed through software instructions executed by a network processor). Reconfiguration of the logic may be performed by storing different values in memory of the forwarding logic 208 such as TCAM 224 or other memory element while the rest of the forwarding logic 208 remains fixed. In various embodiments, the values stored in the memory may provide control inputs to forwarding logic 208, but are not typical instructions that are part of an instruction set executed by a processor. By implementing this logic in hardware, the network element 108 may process incoming traffic (e.g., switch/bridge the traffic) at much higher speeds (e.g., at line rate) than an appliance that utilizes a network processor to process incoming network traffic.

Parsing logic 216 may be operable to receive packets from the ingress ports of network element 108. The parsing logic 216 may be configured to parse information from a received packet. Parsing logic 216 may be configured to parse any suitable information, such as one or more protocols associated with (e.g., included within) the packet, a source address (e.g., IP address, MAC address, or other address) of the packet, a destination address (e.g., IP address, MAC address, or other address) of the packet, one or more ports (e.g., source or destination L4 port) associated with the packet, a VLAN identifier, a QoS value, or other suitable information from the packet. In some embodiments, the information to be parsed by parsing logic 216 is based on the information included within various forwarding entries of network element 108 (which could include forwarding entries associated with various different ports of network element 108). In some embodiments, the parsing logic 216 is configured on a port-by-port basis, such that packets from each port may be parsed based on the forwarding entries associated with that port.

The information parsed by parsing logic 126 is passed to key construction logic 218. Key construction logic constructs a key from the output of the parsing logic 126. The key may contain all or a portion of the information parsed from a packet. The key is then passed to the port selection logic 220.

Prior to receiving a key associated with a data packet, port selection logic 208 may receive forwarding entries (or ACL or load balancing criteria) from operating system 212 and configure itself to implement the forwarding entries. For example, port selection logic 208 may store forwarding entries associated with a particular port in a content addressable memory, such as a TCAM 224. When a packet is received on that port, the key generated by key construction logic 218 (and any other suitable information associated with the packet) may be passed to the port selection logic 220. The port selection logic 220 uses the key to perform a lookup in the TCAM 224. Port selection logic 220 will then forward the traffic through the appropriate port of network element 108 in accordance with the forwarding entry that matches the information in the key from the packet (and has the highest priority if multiple forwarding entries match the key). If the packet is to be redirected (e.g., because the key matches the specified load balancing criteria), packet modification logic may modify the appropriate fields of the packet (e.g., destination IP address and/or destination MAC address) before the packet is forwarded out of the appropriate egress port of network element 108. If the packet is not to be redirected according to load balancing criteria, then the usual forwarding process may be applied to the packet (as long as the packet is not blocked by a forwarding entry implementing an ACL entry. For example, port selection logic 218 may access a forwarding table (e.g., based on a destination address of the packet) to determine which port to forward the packet to. In some embodiments, the forwarding table is stored in a separate memory (e.g., static random access memory) from the forwarding entries (e.g., TCAM 224).

In particular embodiments, any or a combination of the parsing of the packet, the construction of the key, and the identification of a forwarding entry applicable to a packet may occur at a line rate of the network element (e.g., within a single cycle of a clock of the network element used to clock incoming data).

FIG. 3 illustrates example load balancing criteria, ACL entries, and traffic forwarding entries in accordance with certain embodiments. In the embodiment depicted, block 300 represents example load balancing criteria, block 320 represents an example ACL with ACL entries 322, and block 350 represents example traffic forwarding entries 352 and 354. In various embodiments, such entries could be utilized by forwarding logic 208 (e.g., the entries may be stored in TCAM 224 and utilized by hardware to forward incoming network traffic).

The load balancing criteria in block 300 specify a destination IP address expressed as an IP address ("200.200.0.0") and a mask ("255.255.255.255"). When compared against a destination IP address of an incoming data packet, the mask may be applied to the IP address of the packet (e.g., a logical AND operation may be applied with the mask and the destination IP address) and the result is compared against the IP address specified in the load balancing criteria to determine whether a match occurs. This allows specification of one IP address or multiple IP addresses using a common format (i.e., IP address and mask). In various embodiments, the destination IP address(es) specified in the load balancing criteria may be one or more virtual IP addresses of network element 108.

The example load balancing criteria also depicts an L4 protocol ("TCP") and an L4 port ("80"). Thus the load balancing criteria in this depiction specifies that network traffic specifying a destination IP address of 200.200.0.0, an L4 protocol of TCP, and a destination L4 port of 80 (thus signifying Hypertext Transfer Protocol (HTTP) traffic) will be load balanced. Other protocols and/or ports may be specified in the load balancing criteria. For example, if the L4 protocol is TCP and/or UDP, the L4 destination port could be 20 (signifying File Transfer Protocol (FTP) data traffic), 25 (signifying Simple Mail Transfer Protocol (SMTP) traffic), 53 (signifying Domain Name System (DNS) traffic), other suitable port number, or a combination of any of these.

As depicted the load balancing criteria is associated with a device group. A device group may be one or more network nodes 104 associated with load balancing criteria. In the embodiment depicted, the network nodes 104 are depicted by IP addresses ("1.1.1.1", "1.1.1.2", "1.1.1.3", and "1.1.1.4"), though network nodes may be identified in any suitable manner. The network traffic matching the destination IP range, L4 protocol, and L4 destination port specified by the load balancing criteria may be load balanced among the network nodes specified by the device group.

ACL 320 comprises ACL entries 322a and 322b. The example ACL entries 322 each permit IP traffic based on a source IP address regardless of the destination IP address. In the embodiment depicted, the IP address ranges are depicted in Classless Inter-Domain Routing (CIDR) notation, though any suitable notation may be used. Entry 322a permits IP traffic with a source IP address matching the IP subnet 100.100.0.0/16 regardless of the destination IP address and entry 322b permits traffic with a source IP address matching the IP subnet 200.200.0.0/16 regardless of the destination IP address.

Block 350 represents traffic forwarding entries that may be produced by merging the load balancing criteria specified in block 300 and the ACL entries of block 320. Entries 352a-d are the result of merging the load balancing criteria of block 300 with the ACL entry 322a. Each forwarding entry of entries 352a-d corresponds to a network node in the device group. Each network node is coupled to a port of the network element 108 identified by one of the port identifiers (e.g., 0x60, 0x61, 0x5f, and 0x62). Each forwarding entry 352a-d specifies that traffic having a source IP address matching the IP subnet 100.100.0.0/16 (this portion of the forwarding entries is derived from ACL entry 322a), a destination IP address of 200.200.0.0, an L4 protocol of TCP, and an L4 port of 80 (this portion of the forwarding entries is derived from the load balancing criteria of block 300) will be redirected to the specified port (and corresponding network node) based on its source IP address. As explained with respect to the load balancing criteria, the IP address ranges in a forwarding entry may be specified in IP address/mask format (where the mask is applied to the IP address of the traffic and compared against the IP address specified in the IP range), though in other embodiments the ranges may be specified in any suitable manner. Each of the forwarding entries 352a-d will result in the redirection of traffic matching the load balancing criteria and the ACL entry 322a to a different port based on the value of the last octet of the source IP address of the traffic. In this example, the traffic is load balanced evenly across the network nodes of the device group, though in other embodiments a heavier load of traffic could be redirected to a particular network node if desired by specifying a larger range of source IP addresses in the forwarding entry corresponding to that network node. Forwarding entries 352e-352h are formed in a similar manner based on the load balancing criteria of block 300 and the ACL entry 322b.

Because the forwarding entries 352 only apply to a subset of traffic matching ACL entries 322, the ACL entries are also included as traffic forwarding entries. Thus any traffic matching ACL entries 322a or 322b but not matching any of the load balancing forwarding entries 352 will be processed based on forwarding entries 354a or 354b. In the embodiment depicted, the traffic will be permitted to be forwarded by network element 108 in a normal fashion (e.g., based on a destination MAC address of the packet using a forwarding table). Forwarding entries 354 are denoted in CIDR notation, though any suitable notation may be used.

In the embodiment depicted, block 350 also depicts a forwarding entry that denies traffic regardless of the source IP address or destination IP address of the traffic. For example, entry 354c denotes that traffic having any source IP address or destination IP address should be denied. In the embodiment depicted, forwarding entry 354c would have a lower priority than forwarding entries 352 and 354a and 354b such that it would only be applied if network traffic didn't match any of the forwarding entries 352, 354a, or 354b. Similarly, the forwarding entries 354a and 354b may have a lower priority than forwarding entries 352 in order to allow load balancing to be performed ahead of application of an ACL entry.

This embodiment is a simplified example. In other embodiments, any other actions may be applied to incoming traffic. For example, particular traffic could be redirected, blocked, or permitted according to any suitable criteria set by the network administrator, network element 108, and/or other entity.

Figure 4:
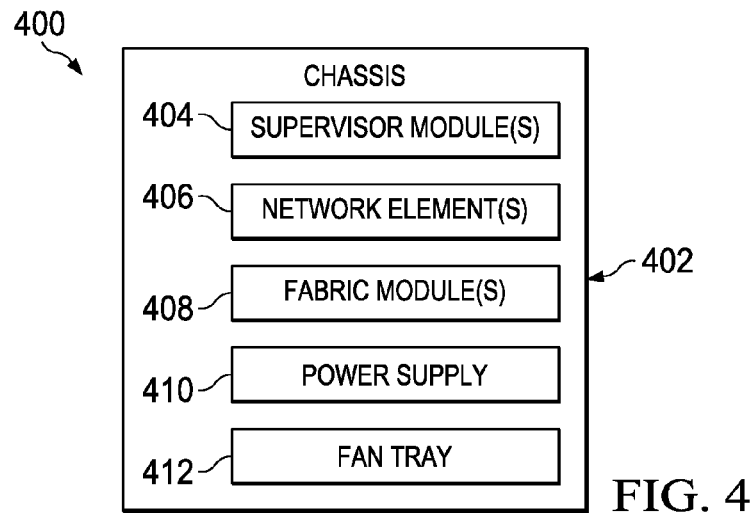
FIG. 4 illustrates a block diagram of one or more network elements embodied within a chassis in accordance with certain embodiments.

FIG. 4 illustrates a block diagram 400 of one or more network elements embodied within a chassis 402 in accordance with certain embodiments. Chassis 402 may include various slots configured to electrically and mechanically couple to various circuit boards (e.g., line cards), such as one or more supervisor module(s) 404, one or more network elements(s) 406, one or more fabric module(s) 408, one or more power supplies (410), one or more fan trays 412, or other components. In various embodiments, a network element 408 may correspond to network element 108. In other embodiments, the entire chassis 402 may correspond to network element 108.

A supervisor module 404 may include a computer system with at least one processor and may be operable to scale the control plane, management, and data plane services for the chassis and its components. A supervisor module 404 may control the Layer 2 and 3 services, redundancy capabilities, configuration management, status monitoring, power and environmental management of the chassis and its components. In some embodiments, supervisor module 404 provides centralized arbitration to the system fabric for all line cards.

Supervisor module 404 may run an operating system, such as Cisco NX-OS or other operating system, designed to support distributed multithreaded processing on symmetric multiprocessors (SMPs), multicore CPUs, and distributed line-card processors. Computationally intensive tasks, such as hardware table programming, can be offloaded to dedicated processors distributed across the line cards. Modular processes of the operating system may be instantiated on demand, each in a separate protected memory space. Thus, processes are started and system resources allocated only when a feature is enabled.

In a particular embodiment supervisor module 404 receives commands from users, processes these commands, and sends relevant configuration information to the network elements 406. For example, a user may send one or more load balancing criteria and one or more ACLs to supervisor module 404. Supervisor module may generate traffic forwarding entries based on the load balancing criteria and ACLs. Supervisor module 404 may also determine which ports the criteria and ACLs apply to and then send the forwarding entries to the relevant network element 406.

Network element 406 may include a distributed forwarding engine for L2/L3 forwarding. Network element 406 may include integrated hardware support for protecting the supervisor CPU from excessive traffic; for providing ACL counters and logging capability, for providing Layer 2 to Layer 4 ACL for both IPv4 and IPv6 traffic, and any other characteristics described herein with respect to network element 108.

Fabric module 408 is capable of coupling the various network elements 406 in the chassis together (e.g., through their respective ports). In connection with the supervisor module 404 and network elements 406, the fabric module 408 may provide virtual output queuing (VoQ) and credit-based arbitration to a crossbar switch to increase performance of the distributed forwarding system implemented by chassis 402.

Chassis 402 may also include one or more power supplies 410 for powering the various components of chassis 402 and one or more fan trays 412 for cooling the various components of chassis 402.

Figure 5:
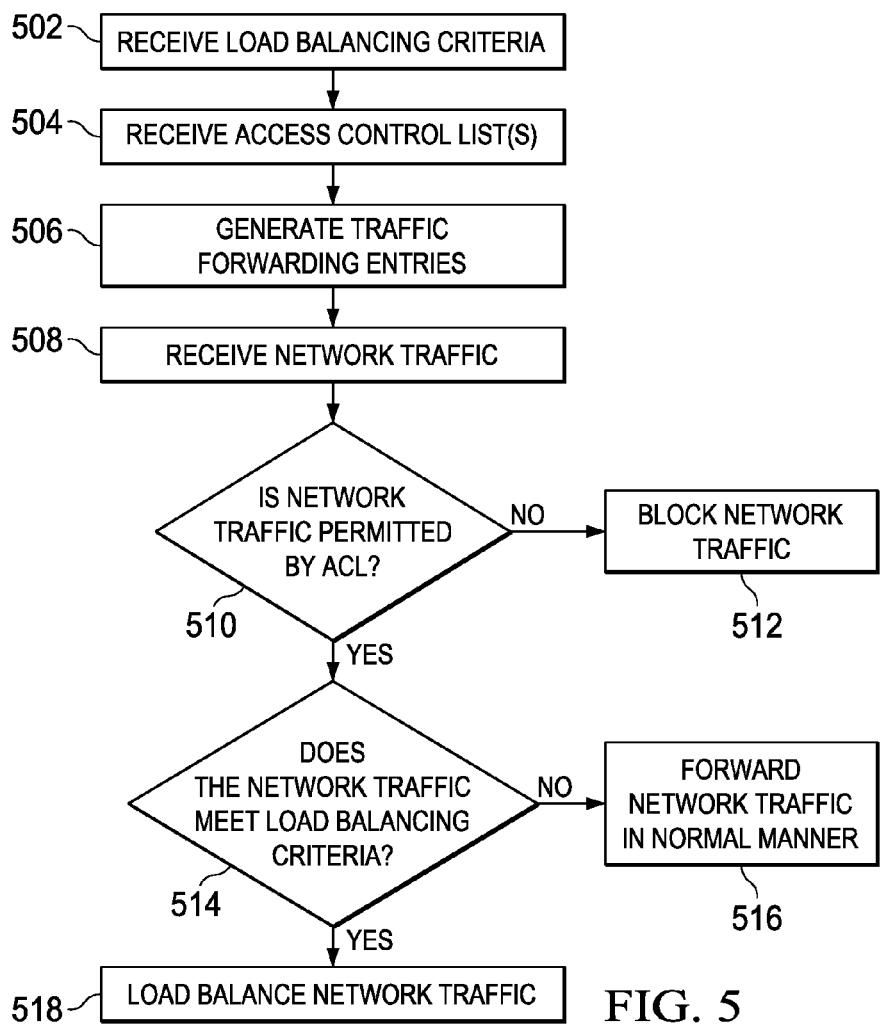
FIG. 5 illustrates an example method for selectively load balancing permitted network traffic in accordance with certain embodiments.

FIG. 5 illustrates an example method for selectively load balancing permitted network traffic in accordance with certain embodiments. The method begins at step 502, where load balancing criteria is received (e.g., from a network administrator). At step 504, one or more ACLs are received. Each ACL may include one or more ACL entries. At step 506, traffic forwarding entries based are formed based on the load balancing criteria and one or more of the ACL entries and programmed into a memory of a network element 108.

At step 508, network traffic is received. At step 510, it is determined whether one or more ACLs allow the network traffic. For example, the network traffic may be checked against one or more forwarding entries that implement the received ACL(s). If it is determined that a forwarding entry that blocks the network traffic should be applied, then the network traffic is blocked at step 512. If the traffic is permitted according to the ACL(s), then at step 514 it is determined whether the network traffic matches the load balancing criteria specified in step 502. If the traffic matches the criteria, the network traffic is load balanced among a group of network nodes associated with the load balancing criteria at step 518. If it does not, the network traffic may be forwarded in a normal manner at step 516. For example, the traffic may be forwarded based on a forwarding table of the network element.

Some of the steps illustrated in FIG. 5 may be repeated, combined, modified or deleted where appropriate, and additional steps may also be added to the flowchart. Additionally, steps may be performed in any suitable order without departing from the scope of particular embodiments. For example, as to particular embodiments, various steps of FIG. 5 may be considered a conceptual explanation of how traffic is handled by network element 108 rather than an exact order of steps. For example, as explained in other portions of this Specification, steps 510 and 514 may be performed at the same time (e.g., through application of a single forwarding entry that merges ACL information and load balancing criteria). As another example, step 510 may include checking multiple forwarding entries and may even involve checking a forwarding entry (e.g., a default forwarding entry) after forwarding entries implementing the load balancing criteria are checked at step 514.

It is also important to note that the steps in FIG. 5 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Additionally, it should be noted that with the examples provided above, interaction may be described in terms of one or more network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of selectively load balancing network traffic, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving an indication of a plurality of network nodes, load balancing criteria, and an access control list (ACL) entry;
    creating a plurality of forwarding entries, wherein a forwarding entry of the plurality of forwarding entries is formed by merging information from the ACL entry and information from the load balancing criteria and includes an indication of a network node of the plurality of network nodes; and
    applying, by a network element, the plurality of forwarding entries to network traffic to selectively load balance the network traffic, wherein network traffic meeting the load balancing criteria and permitted by the one or more ACL entries is load balanced among the plurality of network nodes, and wherein applying a forwarding entry to a data packet of the network traffic comprises searching a memory that stores the plurality of forwarding entries to select a forwarding entry of the plurality of forwarding entries that matches the data packet and forwarding the data packet to the network node indicated by the selected forwarding entry, wherein selecting the forwarding entry that matches the data packet comprises simultaneously determining that the data packet matches information from the ACL entry and information from the load balancing criteria included in the forwarding entry that is selected.

2. The method of claim 1, wherein the load balancing criteria comprises a range of one or more destination IP addresses.

3. The method of claim 2, wherein the range of one or more destination IP addresses corresponds to one or more virtual IP addresses of the network element.

4. The method of claim 1, wherein the load balancing criteria comprises a layer 4 protocol.

5. The method of claim 1, wherein the load balancing criteria comprises a layer 4 destination port.

6. The method of claim 1, further comprising accessing a forwarding table of the network element to determine an egress port for network traffic that is permitted by the one or more ACL entries but does not meet the load balancing criteria.

7. The method of claim 1, wherein a forwarding entry of the plurality of forwarding entries specifies a range of source IP addresses and an indication of a port to forward network traffic to that is permitted by the ACL entry, matches the load balancing criteria, and comprises a source IP address within the range of source IP addresses.

8. The method of claim 1, wherein the network element determines whether any of the plurality of forwarding entries applies to a data packet of the network traffic within a single clock cycle of the network element.

9. The method of claim 1, further comprising receiving the load balancing criteria and the one or more ACL entries via a command line interface from a user of the network element.

10. The method of claim 1, wherein the memory is a ternary content-addressable memory (TCAM) of the network element.

11. The method of claim 1, wherein a forwarding entry of the plurality of forwarding entries includes one or more parameters derived from an ACL entry and one or more parameters derived from the load balancing criteria.

12. An apparatus comprising:
at least one memory element to store a plurality of forwarding entries, a forwarding entry of the plurality of forwarding entries formed by merging information from an access control list (ACL) entry and information from load balancing criteria and including an indication of a network node of a plurality of network nodes;
forwarding logic to:
receive network traffic; and
selectively load balance the network traffic by applying the plurality of forwarding entries to the network traffic, wherein network traffic meeting the load balancing criteria and permitted by the one or more ACL entries is load balanced among the plurality of network nodes, wherein applying a forwarding entry to a data packet of the network traffic comprises searching the at least one memory element to select a forwarding entry of the plurality of forwarding entries that matches the data packet and forwarding the data packet to the network node indicated by the selected forwarding entry, wherein selecting the forwarding entry that matches the data packet comprises simultaneously determining that the data packet matches information from the ACL entry and information from the load balancing criteria included in the forwarding entry that is selected.

13. The apparatus of claim 12, wherein the load balancing criteria comprises a range of one or more destination IP addresses, a layer 4 protocol, and a layer 4 destination port.

14. The apparatus of claim 13, wherein the range of one or more destination IP addresses corresponds to one or more virtual IP addresses of the apparatus.

15. The apparatus of claim 12, wherein the at least one memory element comprises a ternary content addressable memory.

16. The apparatus of claim 12, wherein:
each forwarding entry of the plurality of forwarding entries specifies a range of source IP addresses; and
each forwarding entry of the plurality of forwarding entries indicates a port through which to forward network traffic that matches the load balancing criteria and comprises a source IP address within the range of source IP addresses of the respective forwarding entry.

17. A computer-readable non-transitory medium comprising one or more instructions that when executed by a processor configure the processor to cause programmable logic to perform one or more operations comprising:
receiving an indication of a plurality of network nodes, load balancing criteria, and an access control list (ACL) entry;
creating a plurality of forwarding entries, wherein a forwarding entry of the plurality of forwarding entries is formed by merging information from the ACL entry and information from the load balancing criteria and includes an indication of a network node of the plurality of network nodes; and
applying, by a network element, the plurality of forwarding entries to network traffic to selectively load balance the network traffic, wherein network traffic meeting the load balancing criteria and permitted by the one or more ACL entries is load balanced among the plurality of network nodes, and wherein applying a forwarding entry to a data packet of the network traffic comprises searching a memory that stores the plurality of forwarding entries to select a forwarding entry of the plurality of forwarding entries that matches the data packet and forwarding the data packet to the network node indicated by the selected forwarding entry, wherein selecting the forwarding entry that matches the data packet comprises simultaneously determining that the data packet matches information from the ACL entry and information from the load balancing criteria included in the forwarding entry that is selected.

18. The medium of claim 17, wherein the load balancing criteria comprises a range of one or more destination IP addresses, a layer 4 protocol, and a layer 4 destination port.

19. The medium of claim 18, wherein the range of one or more destination IP addresses corresponds to one or more virtual IP addresses of the apparatus.

20. The medium of claim 17, wherein the memory comprises a ternary content addressable memory.

21. The medium of claim 17, wherein a forwarding entry of the plurality of forwarding entries specifies a range of source IP addresses and an indication of a port to forward network traffic that matches the load balancing criteria and comprises a source IP address within the range of source IP addresses.

* * * * *